United States Patent
Elliot

(10) Patent No.: US 10,971,166 B2
(45) Date of Patent: Apr. 6, 2021

(54) LOW LATENCY AUDIO DISTRIBUTION

(71) Applicant: BOSE CORPORATION, Framingham, MA (US)

(72) Inventor: Michael W. Elliot, Grafton, MA (US)

(73) Assignee: BOSE CORPORATION, Framingham, MA (US)

(*) Notice: Subject to any disclaimer, the term of this patent is extended or adjusted under 35 U.S.C. 154(b) by 132 days.

(21) Appl. No.: 16/170,347

(22) Filed: Oct. 25, 2018

(65) Prior Publication Data

US 2019/0130923 A1 May 2, 2019

Related U.S. Application Data

(60) Provisional application No. 62/580,489, filed on Nov. 2, 2017.

(51) Int. Cl.
| | | |
|---|---|---|
| *G10L 19/022* | (2013.01) | |
| *G10L 19/008* | (2013.01) | |
| *H04N 21/436* | (2011.01) | |

(52) U.S. Cl.
CPC .......... *G10L 19/022* (2013.01); *G10L 19/008* (2013.01); *H04N 21/43615* (2013.01)

(58) Field of Classification Search
None
See application file for complete search history.

(56) References Cited

U.S. PATENT DOCUMENTS

| | | | | |
|---|---|---|---|---|
| 4,941,152 A | * | 7/1990 | Medan | H04B 1/667 375/240 |
| 5,752,223 A | * | 5/1998 | Aoyagi | G10L 19/10 704/219 |
| 6,111,912 A | * | 8/2000 | Cohen | H04L 1/0046 375/225 |
| 6,735,195 B1 | * | 5/2004 | Mehta | H04L 12/2854 370/352 |
| 6,889,257 B1 | * | 5/2005 | Patel | H04N 7/17336 348/E7.073 |
| 7,555,476 B2 | * | 6/2009 | Holbrook | G06Q 40/04 |
| 2003/0143995 A1 | * | 7/2003 | Friedman | H04B 7/18578 455/429 |

(Continued)

FOREIGN PATENT DOCUMENTS

| | | |
|---|---|---|
| GB | 2444096 A | 5/2008 |
| JP | 2002268691 A | 9/2002 |
| WO | 2009043915 A2 | 4/2009 |

OTHER PUBLICATIONS

International Search Report and Written Opinion from corresponding International Application No. PCT/US2018/057498 dated Dec. 12, 2018.

*Primary Examiner* — Fariba Sirjani

(74) *Attorney, Agent, or Firm* — Lando & Anastasi, LLP

(57) ABSTRACT

A method includes receiving data in a first series of blocks each having a first number of audio samples and repackaging the data into a second series of blocks each having a second number of audio samples. The second number of audio samples is a non-integer fraction of the first number of audio samples. The method further includes transmitting the second series of blocks over a series of fixed duration time intervals, and adjusting the payload of adjacent time intervals to reduce jitter in the transmission of the second series of blocks.

19 Claims, 4 Drawing Sheets

(56) References Cited

U.S. PATENT DOCUMENTS

| | | | |
|---|---|---|---|
| 2004/0047369 A1* | 3/2004 | Goel | H04L 47/2416 370/516 |
| 2004/0268203 A1* | 12/2004 | Koyata | G10L 21/0364 714/752 |
| 2006/0167683 A1* | 7/2006 | Hoerich | G10L 19/24 704/230 |
| 2006/0184261 A1* | 8/2006 | Ng | H04N 21/8106 700/94 |
| 2006/0241796 A1* | 10/2006 | Messer | H04N 21/4341 700/94 |
| 2007/0135046 A1* | 6/2007 | Kapur | H04W 76/14 455/41.2 |
| 2008/0288845 A1* | 11/2008 | Tsfati | H03M 13/6306 714/748 |
| 2009/0232220 A1* | 9/2009 | Neff | H04N 21/235 375/240.21 |
| 2009/0248921 A1* | 10/2009 | Kim | H04L 49/901 710/53 |
| 2010/0046504 A1* | 2/2010 | Hill | H04L 65/607 370/352 |
| 2010/0284417 A1* | 11/2010 | Gurdan | H04L 67/2823 370/401 |
| 2011/0022924 A1* | 1/2011 | Malenovsky | G10L 19/26 714/752 |
| 2011/0206147 A1* | 8/2011 | Hariharan | H04L 1/08 375/260 |
| 2013/0018620 A1* | 1/2013 | Riendeau | G01M 5/00 702/89 |
| 2014/0139738 A1* | 5/2014 | Mehta | H04N 5/04 348/515 |
| 2015/0245306 A1* | 8/2015 | Boehlke | H04N 21/43637 370/350 |
| 2016/0225382 A1* | 8/2016 | Kjoerling | G10L 19/018 |
| 2017/0243595 A1* | 8/2017 | Kjoerling | G10L 19/022 |
| 2017/0249087 A1* | 8/2017 | Shekhar | G06F 11/1469 |
| 2017/0318068 A1* | 11/2017 | Kikkeri Shivadatta | H04N 21/242 |
| 2018/0048744 A1* | 2/2018 | Bhat Noojady Krishna | H04L 12/10 |
| 2018/0192385 A1* | 7/2018 | Boehlke | H04R 5/04 |
| 2018/0212809 A1* | 7/2018 | Bakulin | H04B 7/0465 |
| 2019/0124444 A1* | 4/2019 | Lawrence | H04R 3/04 |
| 2019/0190634 A1* | 6/2019 | Tiwari | H04L 27/2628 |
| 2019/0297589 A1* | 9/2019 | Boehlke | H04R 5/04 |

* cited by examiner

LOW LATENCY AUDIO DISTRIBUTION

CROSS-REFERENCE TO RELATED APPLICATIONS

This application claims priority under 35 U.S.C. § 119(e) to U.S. Provisional Patent Application Ser. No. 62/580,489, titled "LOW LATENCY AUDIO DISTRIBUTION", filed Nov. 2, 2017, which is incorporated by reference herein in its entirety.

BACKGROUND

Audio content signals are sometimes processed or distributed through one or more systems before reaching a device that renders the audio content into an acoustic signal for listening. In some cases, it may be desirable for the audio content to be rendered in a timely manner to be synchronized with other related events, such as audio content associated with a video signal or other visual event or content. For example, a television program may include both video and audio content, and the device that renders the audio content (e.g., a loudspeaker) may be a different device than that which renders the visual element (e.g., a video display). In some instances, it may be desirable for the loudspeaker to process and distribute the audio content to a further rendering device, such as a headset, for example. Various systems that may process or distribute the audio content prior to rendering the audio content as an acoustic signal may add amounts of latency (e.g., delay) and inconsistency (e.g., delay variation, jitter) that cause the rendered acoustic signal to be perceived by a user as unsynchronized with the rendered video. It is therefore desirable to process and distribute audio content in a manner with reduced latency and/or reduced jitter.

SUMMARY

Aspects and examples are directed to audio systems and methods that reduce latency and jitter by receiving blocks or groups of audio samples at intervals and re-concentrating the audio samples into a differing block size, accommodating varying compression and packetized radio transmission units, to achieve arrival at a further audio device with sufficiently low latency as to allow human perception to consider the audio to be synchronized with other elements, such as a video element.

In accordance with one aspect, there is provided a method comprising receiving data in a first series of blocks each having a first number of audio samples, repackaging the data into a second series of blocks each having a second number of audio samples, wherein the second number of audio samples is a non-integer fraction of the first number of audio samples, transmitting the second series of blocks over a series of fixed duration time intervals, and adjusting the payload of adjacent time intervals to reduce jitter in the transmission of the second series of blocks.

In some examples, the duration of each time interval accommodates a non-integer multiple of the second series of blocks.

In some examples, the fixed duration time interval is an integer multiple of 625 microseconds.

In some examples, each time interval may include one or more fixed duration time slots. Each of the one or more fixed duration time slots may be 625 microseconds.

In some examples, transmitting the second series of blocks over a series of fixed duration time intervals includes transmitting over a wireless interface. The wireless interface may be a Bluetooth interface.

In some examples, the first number of audio samples includes 192 audio samples per a number of audio channels.

In some examples, the second number of audio samples includes 120 audio samples per a number of audio channels.

In accordance with another aspect, there is provided an audio system comprising a first audio interface configured to receive data in a first series of blocks each having a first number of audio samples, a processor configured to encode the received data and assemble the encoded received data into a second series of blocks each having a second number of audio samples, and a second audio interface configured to provide the second series of blocks over a wireless interface.

Various aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Figure 1:
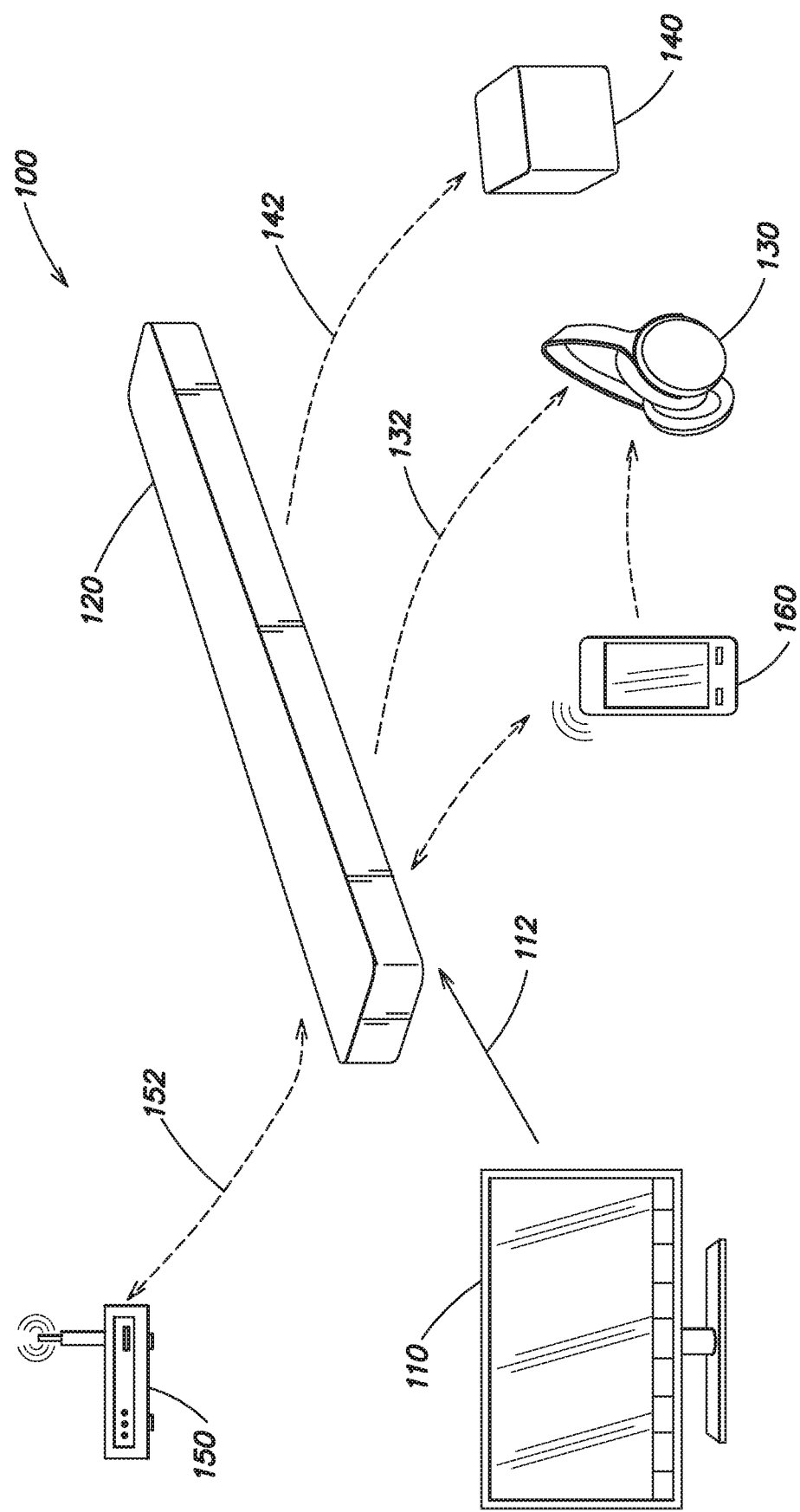
FIG. 1 is a schematic diagram of an example environment in which various audio and video systems may work together.

Aspects of the present disclosure are directed to audio systems and methods that distribute audio program content, e.g., in the form of blocks or groups of audio samples, from an audio source to an audio rendering device. Various audio conversions, mixing, compression, encoding, packetizing, buffering, queueing, multiplexing, and transmitting over wired or wireless links may be included in various examples.

At least one example includes an audio system that receives audio program content from a video system, in conformance with a particular audio interface, and provides the audio program content to a further audio device, such as a speaker or headset, in conformance with another audio interface. The audio program content may be received in one format and provided in another format. In some examples, audio program content may be received in a multi-channel surround sound format, and may be provided in a 2-channel stereo format. In some examples, audio program content may be received in an uncompressed format and may be provided in a compressed format, or vice versa, or may be received in a first compressed format and provided in a different compressed format. In certain examples, audio program content may be provided to an audio device over a wireless protocol, such as a Bluetooth™ or a Wi-Fi (e.g., IEEE 802.11) protocol. In certain examples, audio program content is received in a digital form over one of a Sony/Philips Digital Interconnect Format (S/PDIF), a High Definition Multimedia Interface (HDMI), an HDMI Audio Return Channel (ARC) interface, or a DisplayPort™ interface, and is provided over a Bluetooth™ interface, a Wi-Fi interface, or other suitable interfaces, and may be in conformance with any of various profiles or specifications, such as an Advanced Audio Distribution Profile (A2DP), a Cordless Telephony Profile (CTP), a Generic Audio/Video Distribution Profile (GAVDP), a Headset Profile (HSP), a Hands-Free Profile (HFP), or others.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 illustrates an example environment 100 in which systems and methods in accord with aspects and examples described herein may operate. A video device 110, such as a television, may provide audio content to an audio device 120, such as a sound processor, a loudspeaker, or soundbar, over an interface 112, which may be wired but could also be a wireless interface. The audio device 120 may produce (render) the audio content as acoustic signals for a user to hear audio associated with a video program displayed on the video device 110. The audio device 120 may also or alternatively provide the audio content to one or more audio rendering devices 130, 140, such as a headset or a remote speaker, for example, over various interfaces 132, 142, which may be wireless interfaces, although in some examples may be wired. An audio format received by the audio device 120 may be different than the audio format provided to the audio rendering devices 130, 140, because the audio rendering devices 130, 140 may require a different format or the interfaces 132, 142 may not support the same format as the interface 112, or both. Systems and methods in accord with aspects and examples described herein process and distribute the audio content (e.g., within the audio device 120) in a manner to reduce added latency and jitter, to minimize the total latency from the audio source (e.g., the video device 110) to the audio rendering device (e.g., the audio rendering devices 130, 140). In some examples, the audio device 120 may include further interfaces to receive, process, or provide audio content to, e.g., a network interface such as a wireless router 150, or a mobile device, such as a smart phone 160, or other various devices. In some examples, the audio device 120 may provide the audio content over a Wi-Fi interface, such the interface 152, e.g., to provide the audio content to an audio rendering device that may be coupled to the audio device 120 through a Wi-Fi network (e.g., rather than or in addition to Bluetooth™). Further, any of the audio rendering devices 130, 140 may also include interfaces to other devices, such as between the audio rendering device 130 and the smart phone 160, as shown.

The interface 112 may be any of various interface types, such as S/PDIF or HDMI, for example. Most current HDMI specifications do not address the issue of latency nor include any accommodation for latency negotiation between devices and/or systems. Rendering presentation time is generally presumed to be immediate, e.g., upon arrival of the audio data. Given no other information, a preferred maximum delay from receipt of audio data until rendering may be about 70-100 msec, but the existence of a number of systems, each having various processing, in line between the audio source and the audio rendering device conventionally may cause a latency of from 120 msec up to 150 or 200 msec, or more, in an example environment such as shown in FIG. 1. Systems and methods in accord with aspects and examples described herein, however, may achieve 100 msec or less latency, e.g., from when an audio sample is received from the interface 112 until it is rendered on, e.g., the audio rendering device 130, for instance.

In various examples, audio content may be received via, e.g., the interface 112, in various formats. For example, the audio content may include a various number of channels, such as a single channel (mono), two channels (stereo), 5.1 channels (surround), or another number of more or fewer channels. The audio content may also be received at one or more various sampling rates. Common sampling rates include 48,000 samples/sec (48 K) or 44,100 samples/sec (44.1 K), but other sampling rates may be supported in various examples, such as 24 K, 12 K, or 8 K samples per second. The audio content may also be received at one or more resolutions, or bit depths. For example, the audio content may be received as 16-bit samples per channel. In other examples, each audio sample may be 8 bits, 20 bits, 24 bits, or other bit resolutions. The audio content may be compressed, encoded, packetized, or otherwise formatted in various ways, that may reduce the audio sample sizes and/or bit rates, or may increase overhead (and bit rates). For instance, in some examples the audio content may be received as pulse code modulated (PCM) data, e.g., without compression. In other examples, the audio content may be coded, for example, as adaptive differential pulse code modulation (ADPCM) or other schemes to reduce a total bit rate. For example, an ADPCM sample may require only 4 or 8 bits per sample to achieve a nearly equivalent quality of a 16-bit PCM sample, thus reducing a total number of bits required to provide the audio content.

The operation of an example audio system is described below with respect to an example input audio stream and an example output audio stream. At least one example described below includes receiving 5.1-channel audio content at a 48 K sampling rate over an HDMI and/or S/PDIF interface, but it should be understood that other audio content formats are equally capable of being supported by the aspects and examples described. The example described below provides 2-channel audio content over a Bluetooth™ interface in conformance with an A2DP profile, but other formats are equally capable of being supported by the aspects and examples described. The example described maintains a 48 K sampling rate, from the audio content received to the audio content provided, but down-sampling, e.g., to 44.1 K, may be supported by various examples, and various received sample rates may generally be up-sampled or down-sampled in various examples to accommodate needs of an audio rendering device in light of the format of provided audio content.

Figure 2:
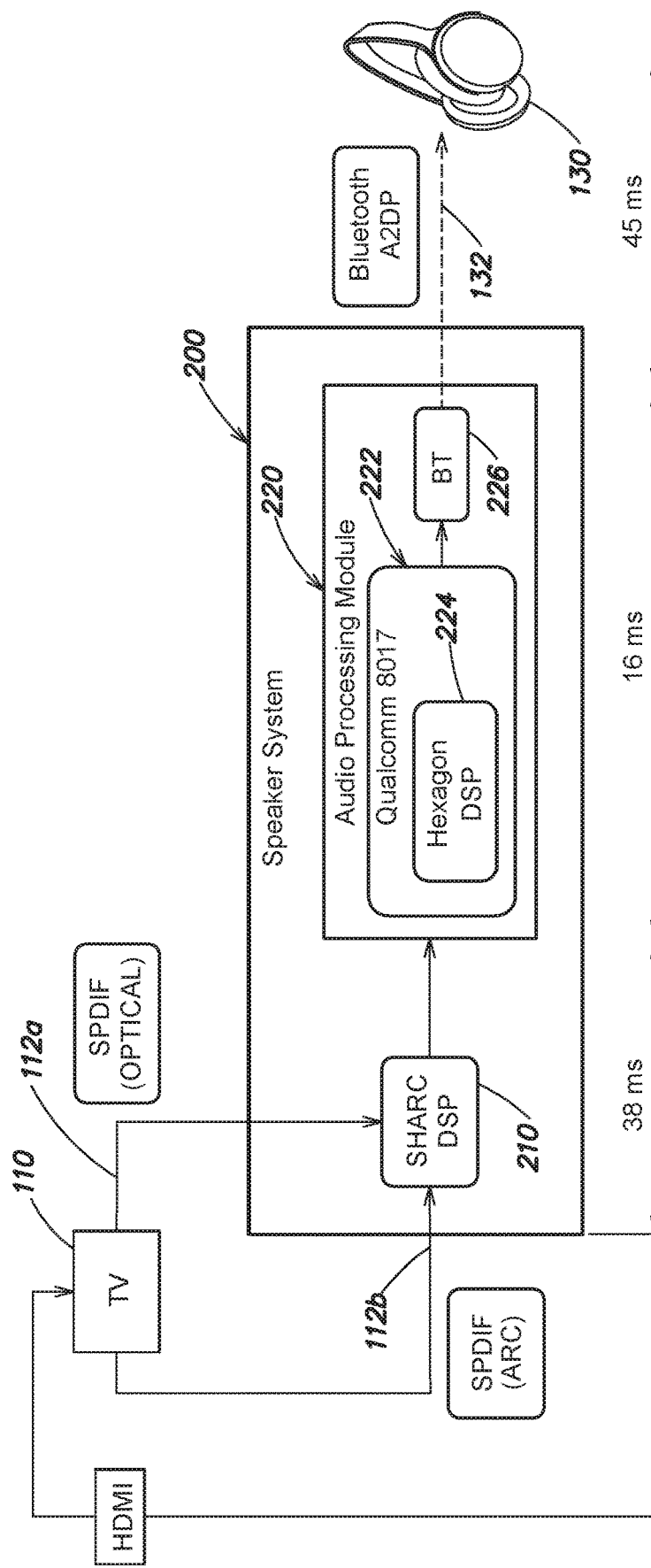
FIG. 2 is a block diagram of an example distribution of an audio content signal from a source to a rendering device.

FIG. 2 illustrates an example audio system 200, which may be part of the audio device 120 of FIG. 1, that provides audio processing and distribution to provide audio content to the audio rendering device 130 (and/or 140 or 160) with reduced latency and jitter. As discussed above, the audio system 200 may receive audio content from a video source 110 over an interface 112. Also illustrated in FIG. 2 is a further video device 114, such as a Blu-Ray™ player, set-top box (STB), or other video source, that may be the ultimate source of the audio content (and associated video content). In this example, the audio content may be received as 5.1-channel surround sound at a 48 K sampling rate. The audio system 200 may include a first digital signal processor (DSP) 210, and an audio processing module 220. The audio processing module 220 may include an audio processor 222 (that may further include a second digital signal processor 224) and an output interface 226, which in this example is a Bluetooth™ radio interface.

The first DSP 210 may be an Analog Devices™ SHARC® floating-point DSP, in some examples, but may be any of various suitable DSPs. Some examples may omit the first DSP 210. The audio processor 222 may be a Qualcomm™ APQ8017 processor, which may include a Hexagon™ DSP, in some examples, but any of various other processors, with or without DSPs, may be suitable.

In the example audio system 200, the first DSP 210 may receive the audio content from one of multiple interfaces 112a, 112b (collectively "112") and may convert the audio content to a format suitable for the audio processor module 220. For example, received audio content in a Dolby™ 5.1-channel surround sound format may ultimately be provided in a 2-channel stereo format to the audio rendering device 130, and the first DSP 210 may process the audio content to, e.g., decode the Dolby™ format and downmix the 5.1-channels to a suitable 2-channel pair. In some examples, such an operation may take about 38 msec. The audio content may be further processed by the audio processing module 220 to prepare the audio content to be provided to the Bluetooth™ interface 226 in a form that conforms to a required format, such as A2DP. In some examples, processing by the audio processing module 220 may add about 16 msec of latency. The 16 msec time may include time in ping/pong buffering, time to mix, encode, and packetize audio samples, as necessary in various instances, and transfer to a Bluetooth™ stack. The Bluetooth™ interface 226 may transmit the audio content over the air (e.g., the interface 132) to the audio rendering device 130, which may render the audio content into acoustic signals for, e.g., human listening. In some examples, the latency from a time that an audio sample is provided to an output stack or queue associated with the Bluetooth™ interface 226 until the audio sample is acoustically rendered may be up to about 45 msec. The 45 msec time may include time the audio sample spends in a jitter buffer and time to decode and process the audio content on the audio rendering device 130.

Figure 3:
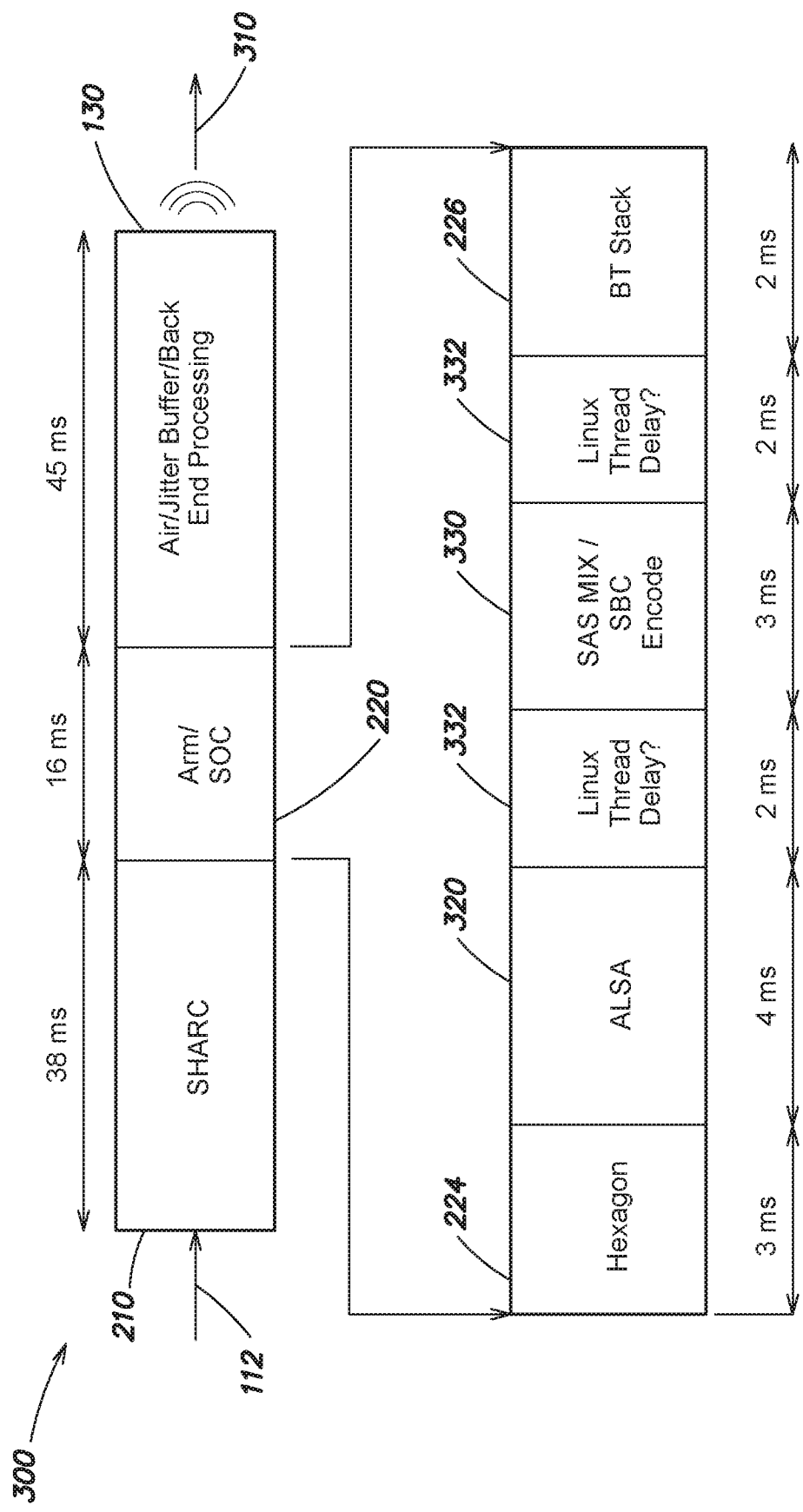
FIG. 3 is a schematic diagram of an example of a processing sequence portion for an audio content signal during distribution from a source to a rendering device.

FIG. 3 illustrates an example of a processing and rendering pipeline 300 that may be implemented by, e.g., the audio system 200 of FIG. 2, in cooperation with the audio rendering device 130. Audio content (in various formats, as previously described) may be received at the input interface 112 and handled by the first DSP 210 to decode and downmix the audio content into a format to be processed by the audio processor module 220, which may include a system on a chip (SOC), such as the Qualcomm™ APQ8017 processor, or other type of processing component suitable for processing and encoding audio samples The audio processor module 220 may include an ARM core in some examples, and the audio processor module 220 may run a Linux operating system in some examples, though the audio processor module 220 may run any suitable operating system in other examples. Processing by the audio processing module 220 results in audio samples being provided to an output interface, which may support wireless transmission, such as by Bluetooth™ whereby the audio samples are transmitted over the air, and may be buffered (e.g., jitter buffer), decoded, and otherwise processed by the audio rendering device 130 into an output acoustic signal 310.

With continuing reference to FIG. 3, the audio processor module 220 may, in some examples, receive audio content from the first DSP 210 (or, in some examples, receive directly from an input interface 112). The audio processor module 220 may perform some initial processing in a second DSP 224 and/or may include processing by an Advanced Linux Sound Architecture (ALSA) component 320 to further provide audio samples to a thread of the operating system, such as an encoding thread 330, that provides encoding of the audio samples for transmission over a Bluetooth™ interface, e.g., by providing the audio samples in an encoded and packetized (e.g., blocks, frames, transmission units) form to a Bluetooth™ stack (e.g., of the Bluetooth™ interface 226). In some examples, encoding of the audio samples includes encoding the audio samples using a sub-band codec (SBC).

FIG. 3 also indicates nominal latency times 340, which includes some time for thread scheduling 332. Some examples may include a first-in first-out (FIFO) real-time thread scheduler to achieve wake-up or scheduling times of a few milliseconds, or in some examples to achieve wake-up times as low as 200 μsec to 300 μsec, or less.

In various examples, the Bluetooth™ interface 226 supports transmission bit rates of 1 Mbits/sec, 2 Mbits/sec, or 3 Mbits/sec. Uncompressed 16-bit 2-Channel PCM audio at 44.1 K samples per second produces a 1.411 Mbits/sec bit rate, while a 48 K sampling rate produces a 1.536 Mbits/sec bit rate. Either of these, if transmitted directly over Bluetooth™ would consume a significant portion of available link bandwidth. Accordingly, selection of encoding and a suitable codec may be important to performance of a link. In some examples, the Bluetooth™ interface 226 may handle audio content in a time division multiplexed manner, and using, e.g., the Logical Link Control and Adaptation Protocol (L2CAP), and provides for time slots of 625 µsec duration. Any of 1, 3, or 5 slots may be utilized for transmissions, and during the time slot the Bluetooth™ interface 226 may transmit at the above described 1, 2, or 3 Mbits/sec transmission rate. In at least one example, selected combinations of transmission (modulation) bit rate and number of slots are shown in Table 1, along with resulting maximum payload size under conditions of at least one example of codec parameters. Additional examples may provide varying payload sizes for various codec parameters.

TABLE 1

| BT Slot Type | Number of Slots | Max Payload Size | Modulation Bit Rate |
| --- | --- | --- | --- |
| 2-DH3 | 3 | 367 bytes | 2 Mbit/sec |
| 3-DH3 | 3 | 552 bytes | 3 Mbit/sec |
| 2-DH5 | 5 | 679 bytes | 2 Mbit/sec |
| 3-DH5 | 5 | 1021 bytes | 3 Mbit/sec |

The A2DP Profile allows venders to use custom codecs, and the A2DP profile includes a Real Time Protocol (RTP) header and provides for the following total frame sizes, in bytes:

RTP Header: 12
SBC Frame 1: 156
SBC Frame 2: 300
SBC Frame 3: 444
SBC Frame 4: 588

In some examples, the encoding thread 330 of the audio processor module 220 receives 2-channel PCM audio samples, at 44.1 K or 48 K samples per second in various examples, from the ALSA 320. The encoding thread 330 efficiently concentrates the PCM audio samples into RTP-Packet/SBC frames.

In some examples, the encoding thread 330 receives PCM audio samples in blocks of 4 msec of audio content at a time. A block of 4 msec of audio samples at a 48 K sampling rate includes 192 audio samples (per channel). In certain examples, the received audio samples are re-concentrated into blocks of fewer audio samples to decrease the latency associated with processing and delivery of the audio samples to an audio rendering device, such as the audio rendering device 130. In some examples, a number of sub-band codec (SBC) frames is selected to efficiently tradeoff between latency and throughput. As described above, two SBC frames can carry up to 300 bytes of audio data, and with reference to Table 1, two SBC frames can be transmitted over a 2-DH3 Bluetooth™ slot type.

Accordingly, in some examples two SBC frames are selected to support 2-channel 48 K audio using SBC coding, where the SBC coding requires 4 bits per sample (per channel). Further in some examples, SBC coded audio samples are assembled into blocks of 120 audio samples. Two channels of 120 audio samples at 4 bits per sample require 120 bytes of payload capacity. Accordingly, a Bluetooth™ A2DP link with two SBC frames may carry up to two blocks of 120 audio samples for each of two channels (stereo) with a 2-DH3 slot type allocation. For clarity, in these examples, a block of 120 audio samples includes 120 audio samples for each channel in a stereo format, thus one block literally includes 240 audio samples. Accordingly, two blocks in these examples contain 480 audio samples, with each audio channel having 240 of the audio samples.

Figure 4:
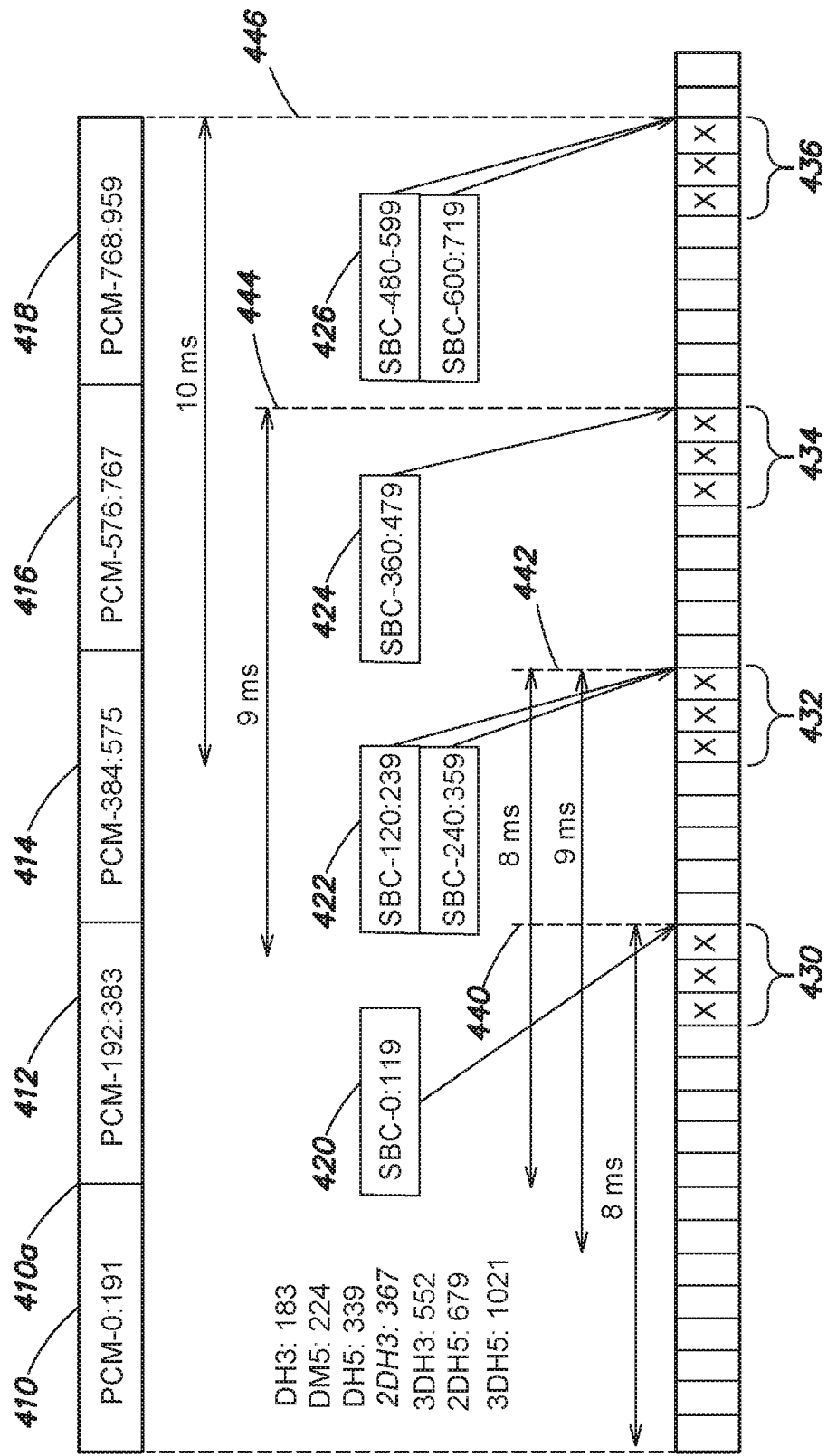
FIG. 4 is a schematic diagram of an example timing sequence for various blocks of audio samples during distribution from a source to a rendering device.

FIG. 4 illustrates an example relative timing of audio samples being received by, e.g., the audio system 200, and being transmitted over, e.g., the interface 132, to be received by, e.g., the audio rendering device 130. In this example, block 410 contains 4 msec of PCM audio samples (e.g., 192 samples per channel at 48 K sampling rate), and is received, e.g., by the encoding thread 330 from the ALSA 320 (each of FIG. 3), at the end of the 4 msec period, as indicated in FIG. 4 at time 410a. Once the PCM block 410 is received (at time 410a) an SBC block 420 may be assembled, and is scheduled to be transmitted in a set of Bluetooth™ slots 430, for arrival at a time 440. A relatively short range transmission, such as over the interface 132, occurs at the speed of light, thus having negligible delay relative to the various processing and other timeframes described. Accordingly, for the purposes of this disclosure, information transmitted over the interface 132 is deemed to be received at the same moment as it is transmitted (except in the instance of dropped and/or corrupt transmissions that may be re-transmitted, in some examples).

In certain examples, including the one illustrated in FIG. 4, the PCM block 410 contains 192 audio samples, and the SBC block 420 contains 120 audio samples (each per channel). Assembly of the SBC block 420 may begin as soon as the first audio sample to be included therein is received, which is at time 410a in this instance. The SBC block 420 includes only 120 audio samples and is therefore ready to transmit without waiting for processing and/or encoding of the remaining 72 audio samples received in the PCM block 410. The remaining 72 audio samples are instead included in the next SBC block 422. Notably, the first audio sample included in the PCM block 410 is received by the audio rendering device at time 440, only 8 msec after it was available to the ALSA 320 (e.g., 4 msec after it was received by the encoding thread 330).

At time 410a, the 72 remaining audio samples from the PCM block 410 that were not included in the first SBC block 420 may continue to be processed (e.g., encoded) for future assembly with audio samples that arrive in the next PCM block 412. Accordingly, when the encoding thread 330 receives the next PCM block 412 containing another 192 audio samples, the encoding thread 330 may assemble a portion of the newly received audio samples with the 72 remaining audio samples from the first PCM block 410, to form two SBC blocks 422 (e.g., two SBC blocks of 120 audio samples each contains 240 audio samples, per channel), leaving 24 audio samples not yet assembled into an SBC block. The two SBC blocks 422 may be transmitted in a set of Bluetooth™ slots 432, for arrival at time 442. Notably, the oldest audio sample received at time 442, which is the oldest sample remaining from the PCM block 410 that was not included in the first SBC block 420, is received 9 msec after it was available to the ALSA 320.

Consecutive PCM blocks 414, 416, 418 are received by the encoding thread 330 at regular 4 msec intervals, and audio samples contained therein are encoded and assembled into one or more SBC blocks 424, 426 containing 120 audio samples each (e.g., as enough audio samples are available to do so). The SBC blocks are transmitted on the interface 132 once assembled, which may include transmitting two SBC blocks per set of Bluetooth™ slots when enough audio samples have been received to do so (e.g., pairs of SBC blocks 422, 426 transmitted in Bluetooth™ slots 432, 436, respectively). As shown in FIG. 4, the arrival times 440, 442, 444, 446 represent latencies (e.g., the oldest audio sample received with reference to when it was available to the ALSA 320, for example) of 8 msec, 9 msec, 9 msec, and 10 msec, respectively.

Various systems and methods in accord with aspects and examples described herein may process audio samples efficiently, as they arrive in blocks at fixed intervals of, e.g., 4 msec, using a real-time priority thread, to encode the audio samples into one or more blocks of differing number of audio samples than the blocks in which they were received. In some examples, the audio samples are encoded as necessary and assembled into blocks of fewer audio samples (per block) than the blocks in which the audio samples arrived, to decrease latency of the oldest sample in the block and to improve synchronization with, e.g., associated video or other content. In certain examples, the audio samples may be encoded and assembled in two, three, or four SBC blocks, to provide an efficient tradeoff of latency and throughput. Encoding and block sizes may be selected in part on the basis of number of channels, sampling rate, sample resolution, and/or other factors.

Blocks containing relatively fewer audio samples may reduce latency but may also increase risk of an underflow occurrence, such as an audio rendering device reaching the last of its available buffered audio samples before the next block of audio samples arrives. Accordingly, in some examples, reduced latency processing may include a reduced robustness as observed by a user who may hear skips in the audio when an underflow occurs. Some examples include components to negotiate latency characteristics between, e.g., the audio system 200 and the audio rendering device 130. A latency negotiation may include agreement as to block sizes, jitter buffer sizes, or other parameters, that may directly affect a user's perception of robustness (chance of underflow, audio skips) and synchronization with, e.g., video (latency, lip-sync). Some examples may provide a user selectable or configurable balance between higher robustness (e.g., fewer skips by providing larger block sizes and larger jitter buffers) and better synchronization (e.g., lower latency by providing smaller block sizes and smaller jitter buffers), and may allow a user to establish an acceptable setting without negotiation between the various devices.

It should be understood that many, if not all, of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), microcontroller(s), and the like, or any combination of these, may be suitable, and may include analog or digital circuit components and/or other components with respect to any particular implementation. Functions and components disclosed herein primarily operate in the digital domain, although some functions may operate in the analog domain, or a combination of the two, in some examples. Certain examples therefore include analog-to-digital converter(s) (ADC) and/or digital-to-analog converter(s) (DAC) where appropriate, despite the lack of illustration of ADC's or DAC's in the various figures. Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method comprising:
receiving data in a first series of blocks each having a first number of audio samples;
repackaging the data into a second series of blocks each having a second number of audio samples, wherein the second number of audio samples is a non-integer fraction of the first number of audio samples;
transmitting the second series of blocks over a series of fixed duration time intervals, wherein at least one block of the second series of blocks is transmitted prior to a portion of the first number of audio samples being repackaged into the second series of blocks; and
adjusting a payload size of a first time interval relative to a payload size of a second time interval to reduce jitter in the transmission of the second series of blocks, the first and second time intervals being sequenced consecutively in the series of fixed duration time intervals.

2. The method of claim 1 wherein the duration of each time interval accommodates a non-integer multiple of the second series of blocks.

3. The method of claim 1 wherein the fixed duration time interval is an integer multiple of 625 microseconds.

4. The method of claim 1 wherein each time interval may include one or more fixed duration time slots.

5. The method of claim 4 wherein each of the one or more fixed duration time slots is 625 microseconds.

6. The method of claim 1 wherein transmitting the second series of blocks over a series of fixed duration time intervals includes transmitting over a wireless interface.

7. The method of claim 6 wherein the wireless interface is a Bluetooth interface.

8. The method of claim 1 wherein the first number of audio samples includes 192 audio samples per a number of audio channels.

9. The method of claim 8 wherein the second number of audio samples includes 120 audio samples per a number of audio channels.

10. The method of claim 1 wherein the first series of blocks are configured as pulse code modulated (PCM) blocks.

11. The method of claim 10 wherein the second series of blocks are configured as sub-band codec (SBC) blocks.

12. An audio system, comprising:
a first audio interface configured to receive data in a first series of blocks each having a first number of audio samples;
a processor configured to encode the received data and assemble the encoded received data into a second series of blocks each having a second number of audio samples; and a second audio interface configured to transmit the second series of blocks over a wireless interface in a series of fixed duration time intervals, wherein at least one block of the second series of blocks is transmitted over the wireless interface prior to a portion of the first number of audio samples being repackaged into the second series of blocks and a payload size of a first time interval is adjusted relative to a payload size of a second time interval to reduce jitter during transmission of the second series of blocks, the first and second time intervals being sequenced consecutively in the series of fixed duration time intervals.

13. The audio system of claim 12 wherein the duration of each of the fixed duration time intervals accommodates a non-integer multiple of the second series of blocks.

14. The audio system of claim 12 wherein each of the fixed duration time intervals are an integer multiple of 625 microseconds.

15. The audio system of claim 12 wherein each of the fixed duration time intervals includes one or more fixed duration time slots.

16. The audio system of claim 15 wherein each of the one or more fixed duration time slots is 625 microseconds.

17. The audio system of claim 12 wherein the wireless interface is a Bluetooth interface.

18. The audio system of claim 12 wherein the first number of audio samples includes 192 audio samples per audio channel.

19. The audio system of claim 18 wherein the second number of audio samples includes 120 audio samples per audio channel.

* * * * *